F. R. ALLEN.
FOLDING VESTIBULE.
APPLICATION FILED JAN. 2, 1913.
1,133,693.
Patented Mar. 30, 1915.
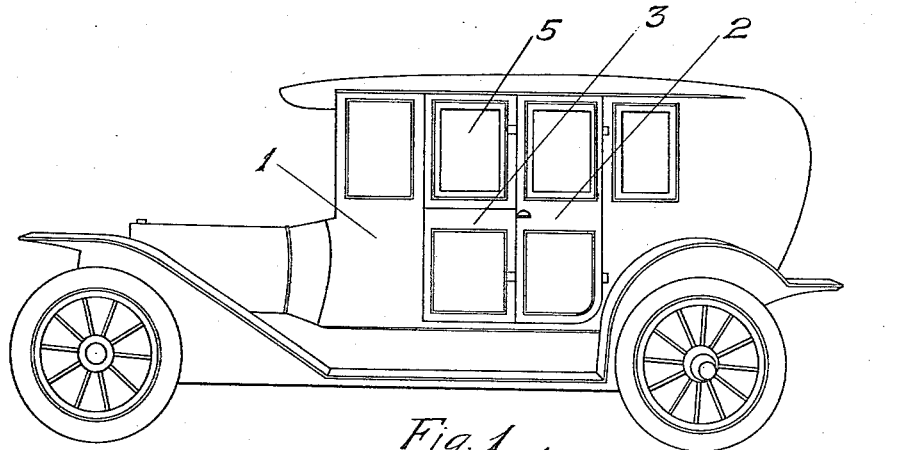
Fig. 1
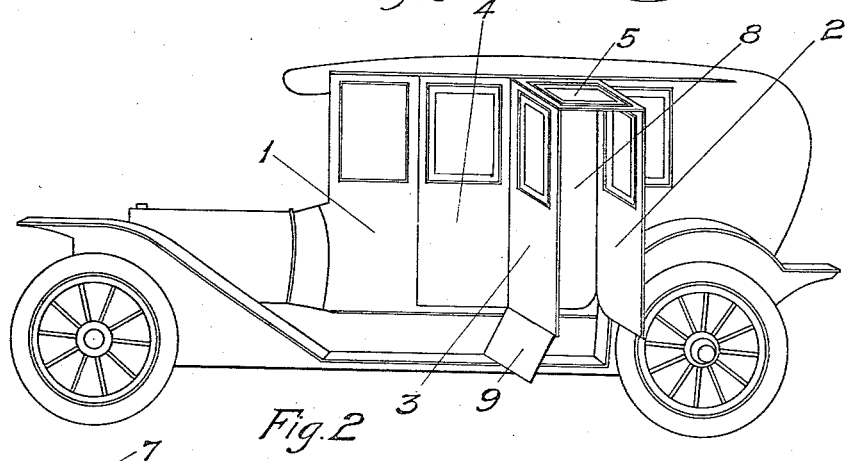
Fig. 2
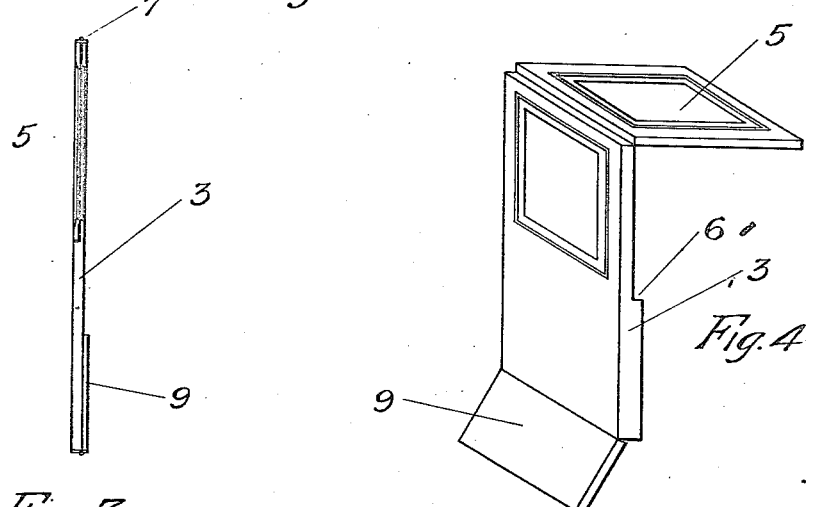
Fig. 3
Fig. 4
Witnesses
George M. Foulds
Justin A. Galland
Inventor
Frank R. Allen
by his Attorney
Andrew Foulds Jr.

UNITED STATES PATENT OFFICE.

FRANK R. ALLEN, OF PASSAIC, NEW JERSEY.

FOLDING VESTIBULE.

1,133,693. Specification of Letters Patent. Patented Mar. 30, 1915.

Application filed January 2, 1913. Serial No. 739,726.

*To all whom it may concern:*

Be it known that I, FRANK R. ALLEN, a citizen of the United States, and residing at the city of Passaic, in the county of Passaic and State of New Jersey, have invented a new and useful Improvement in Folding Vestibules, of which the following is a specification.

My invention relates to improvements in folding vestibules, and the object of my invention is to provide a vestibule for vehicles and the like, which may be extended for use as desired, and may be folded away when not in use.

In the use of the ordinary form of passenger vehicle it is not practicable to drive them sufficiently close to the place where passengers are to enter or leave the vehicle by reason of the projecting wheels, hubs and other parts, and there is therefore left, adjacent the vehicle, a space open to the elements and, in stormy weather, this proves a matter of great inconvenience as well as serious damage to costly garments worn by the passengers. All efforts to correct this defect have heretofore proved unsatisfactory as, prior to my invention, the use of hoods and vestibules on the vehicle itself have not been practical by reason of their consequent destruction of the beauty and symmetry of the vehicle and in city streets an awning or canopy is not permitted to be extended into the roadway because of its interference with other traffic. With my improved device, however, all of these defects are overcome and an ample vestibule or passageway is afforded on the vehicle itself and so arranged that it does not, in the slightest degree, mar or injure the beauty or symmetry of the vehicle. I accomplish this object by means of the device illustrated in the accompanying drawings, which show the preferred form of my device, and in which:

Figure 1 is a view of the device applied to an automobile and in its closed position. Fig. 2 is a view of the same open. Fig. 3 is an edge section of the folding door closed, and Fig. 4 is a view of the same open.

My device is adapted to be used in connection with a vehicle body 1 of any desired form and provided with the usual door 2 for entrance and exit. Adjacent the door 2 and at the side of doorway opposite that at which the door 2 is hung, I provide an auxiliary door 3, which is preferably of approximately the same size as the door 2. This auxiliary door 3 is adapted to be folded back, when not in use, into a recess or seat 4, provided in the side of the vehicle body 1. This auxiliary door 3 is provided at its upper edge section with a leaf 5 which is preferably adapted to normally rest, when in its folded position, in the seat 6 in the door 3. The leaf 5 is preferably hung by hinges 7, or in any other desired manner, from the upper edge section of the door 3 and is of sufficient length, when opened into a horizontal position, to extend across the doorway 8. The door 3 is provided at its lower edge section with an apron 9 which is normally folded up against the side of the door 3 when not in use, and is adapted, when opened, to drop below the lower edge of the door 3. My device being thus assembled, the vestibule is formed by opening the door 2 to a position at approximately a right angle to the side of the vehicle body 1. The leaf 5 is opened out into a horizontal position and the door 3, by which it is carried, is opened to a position at approximately a right angle to the side of the vehicle body 1, in which position the outer edge section of the leaf 5 will rest upon the door 2, forming a cover or roof for the vestibule, the sides of which are formed by the open doors 2 and 3. The apron 9 may thereupon be unfolded from its normal position, when it will swing down below the door 3.

Having thus described my invention, what I claim is—

1. In a device of the character described, the combination of a vehicle body provided with a door way, a door adapted to close the said door way and an auxiliary door, adjacent the said door way, a leaf hung from the upper edge section of said auxiliary door and an apron attached to the lower edge section of said auxiliary door, substantially as shown and described.

2. In a device of the character described, the combination of a vehicle body provided with a door way, a door adapted to close the said door way, an auxiliary door adjacent the said door way, and a member upon one of said doors adapted when open to extend between the upper edge section of said doors whereby a vestibule is formed, substantially as shown and described.

3. In a device of the character described, the combination of a vehicle body provided with a door way, a door adapted to close said door way and an auxiliary door adjacent said door way and a member upon one of said doors adapted to extend between the said doors, and an apron on one of said doors adapted to extend below the door, substantially as shown and described.

In testimony whereof, I have signed my name to this specification in the presence of two subscribing witnesses, this twenty-third day of December, 1912.

FRANK R. ALLEN.

Witnesses:
 ELVA B. ALLEN,
 DAISY COLLARD.